(12) United States Patent
Karstens

(10) Patent No.: US 8,918,543 B2
(45) Date of Patent: Dec. 23, 2014

(54) CHANGING DEVICE FUNCTIONALITY USING ENVIRONMENT CONDITIONS

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 2457 days.

(21) Appl. No.: 11/556,746

(22) Filed: Nov. 6, 2006

(65) Prior Publication Data

US 2008/0108340 A1    May 8, 2008

(51) Int. Cl.
*G06F 3/00* (2006.01)
*H04M 1/725* (2006.01)

(52) U.S. Cl.
CPC ...... *H04M 1/72569* (2013.01); *H04M 2250/12* (2013.01); *H04M 2250/22* (2013.01)
USPC .......................................................... 710/8

(58) Field of Classification Search
USPC .......................................................... 710/8
See application file for complete search history.

(56) References Cited

U.S. PATENT DOCUMENTS

| | | | |
|---|---|---|---|
| 4,977,404 A | 12/1990 | Durst et al. | |
| 2002/0033836 A1 | 3/2002 | Smith | |
| 2002/0173928 A1* | 11/2002 | Willner et al. | 702/127 |
| 2003/0098847 A1 | 5/2003 | Yamamoto | |
| 2005/0090288 A1 | 4/2005 | Stohr et al. | |
| 2006/0041923 A1* | 2/2006 | McQuaide, Jr. | 725/131 |
| 2006/0282709 A1* | 12/2006 | Shu et al. | 714/100 |
| 2007/0075965 A1* | 4/2007 | Huppi et al. | 345/156 |

* cited by examiner

*Primary Examiner* — Idriss N Alrobaye
*Assistant Examiner* — Brooke Taylor
(74) *Attorney, Agent, or Firm* — Yee & Associates, P.C.; Steven L. Bennett

(57) ABSTRACT

A computer implemented method, apparatus, and computer usable program code are provided for changing functionality for an electronic device. A set of signals is received from a set of sensors in the electronic device. Each signal in the set of signals includes a type of sensor from which the signal originated in the set of sensors and information detected by the set of sensors. An action is identified to be issued for the electronic device. The action is identified using the type of sensor and the information. The action is automatically initiated in the electronic device. The automatically initiated action changes the functionality for the electronic device.

20 Claims, 3 Drawing Sheets

| SENSOR | DETECTED SIGNALS | FUNCTION TO BE APPLIED |
| --- | --- | --- |
| ORIENTATION | VERTICAL | CELL PHONE FUNCTION |
| ORIENTATION | HORIZONTAL | VIDEO GAMING FUNCTION |
| TOUCH/PRESSURE | BOTH ENDS | VIDEO GAMING FUNCTION |
| TOUCH/PRESSURE | BOTH SIDES | CELL PHONE FUNCTION |
| TOUCH/PRESSURE | NONE/UNDETERMINED | NORMAL OPERATION |
| TEMPERATURE | BELOW 32° F | LOUD RINGER |
| TEMPERATURE | ABOVE 85° F | LOUD RINGER |
| TEMPERATURE | BETWEEN 32° F AND 85° F | NORMAL RINGER |
| LOCATION | FACTORY FLOOR | LOUD RINGER |
| LOCATION | CAFETERIA | LOUD RINGER |
| LOCATION | LIBRARY | VIBRATE MODE |
| LOCATION | THEATER | VIBRATE MODE |
| LOCATION | UNDETERMINED | NORMAL OPERATION |
| LOCATION | MOVEMENT ABOVE 70MPH | DISABLE DEVICE FUNCTIONALITY |
| IMAGE | EAR | CELL PHONE FUNCTION |
| IMAGE | TELEVISION | REMOTE CONTROL FUNCTION |
| IMAGE | UNDETERMINED | NORMAL OPERATION |
| ILLUMINATION | BRIGHTLY LIT | CANCEL ANY ILLUMINATION |
| ILLUMINATION | DARKLY LIT | ILLUMINATE DISPLAY |
| ILLUMINATION | UNDETERMINED | NORMAL OPERATION |
| IMAGE, TOUCH/PRESSURE | TELEVISION/BOTH SIDES | REMOTE CONTROL FUNCTION |

FIG. 4

CHANGING DEVICE FUNCTIONALITY USING ENVIRONMENT CONDITIONS

BACKGROUND OF THE INVENTION

1. Field of the Invention

The present invention relates generally to electronic device functionality. More particularly, the present invention relates to a computer implemented method, apparatus, and computer usable program code for changing electronic device functionality based on environmental conditions.

2. Description of the Related Art

Many electronic devices are multifunctional, some even multitasking. For example, such an electronic device may provide video gaming functionality as well as cell phone functionality. Such multifunctional electronic devices require the user to manually specify what functionality the user wants to use next. Automatic functionality switching is often too static for a user's preference, for example, pausing a video game when the cell phone rings. Changing functionality from the video gaming functionality to the cell phone functionality may be appropriate at some times but not at other times. Current multifunctional electronic devices lack the capability to adequately interpret the user's intentions based on the multifunctional electronic device's environment.

BRIEF SUMMARY OF THE INVENTION

The illustrative embodiments provide a computer implemented method, apparatus, and computer usable program code for changing functionality for an electronic device. The illustrative embodiments receive a set of signals from a set of sensors in the electronic device. Each signal in the set of signals includes a type of sensor from which the signal originated in the set of sensors and information detected by the set of sensors. The illustrative embodiments identify an action to be issued for the electronic device. The action is identified using the type of sensor and the information. The illustrative embodiments automatically initiate the action in the electronic device. The automatically initiated action changes the functionality for the electronic device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 shows an exemplary table of settings for changing electronic device functionality based on environmental conditions in accordance with an illustrative embodiment.

DETAILED DESCRIPTION OF THE INVENTION

Figure 1:
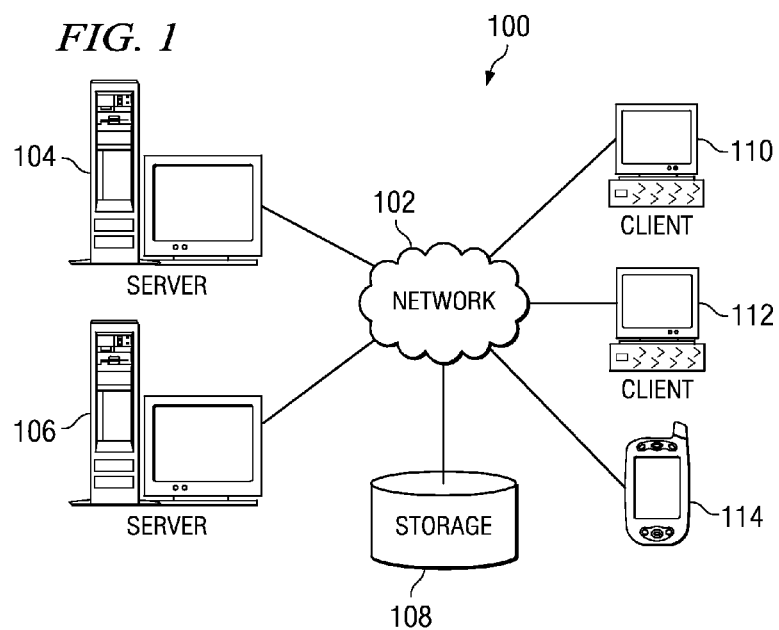
FIG. 1 depicts a pictorial representation of a network of data processing systems in which the illustrative embodiments may be implemented.
Figure 2:
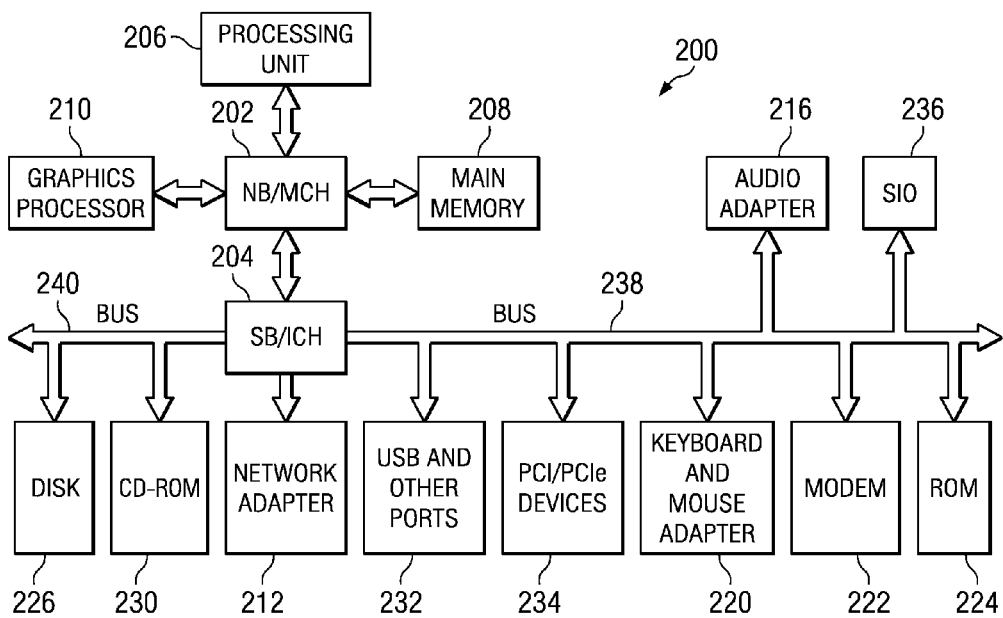
FIG. 2 shows a block diagram of a data processing system in which the illustrative embodiments may be implemented.

The illustrative embodiments provide for changing electronic device functionality based on environmental conditions. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 as well as data processing system within device 114 connect to network 102. Clients 110 and 112 may be, for example, personal computers or network computers. Device 114 may have a data processing system that acts in a similar manner to clients 110 and 112. Device 114 may be, for example, video games, cell phones, telephones, and remote controls or a combination of devices, such as a cell phone that is also a gaming unit and a remote control. In the depicted example, server 104 provides data, such as configuration files and applications to clients 110 and 112 and device 114. Clients 110 and 112, and device 114 are clients to server 104 in this example. Network data processing system 100 may include additional servers, clients, devices, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the illustrative embodiments may be implemented. Data processing system 200 is an example of a computer, such as server 104, client 110, or device 114 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adaptor 212 is coupled to south bridge and I/O controller hub 204 and audio adaptor 216, keyboard and mouse adaptor 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adaptors, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA) or other microprocessor based computing device, which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adaptor. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide multiple means of changing device functions based on environmental conditions. The illustrative embodiments provide for changing device functionality based on:
 orientation of the device;
 how the device is being held;
 location of the device;
 movement of the device;
 temperature of the environment where the device is being used;
 illumination of the area where the device is being used; and
 images captured by the device.

Figure 3:
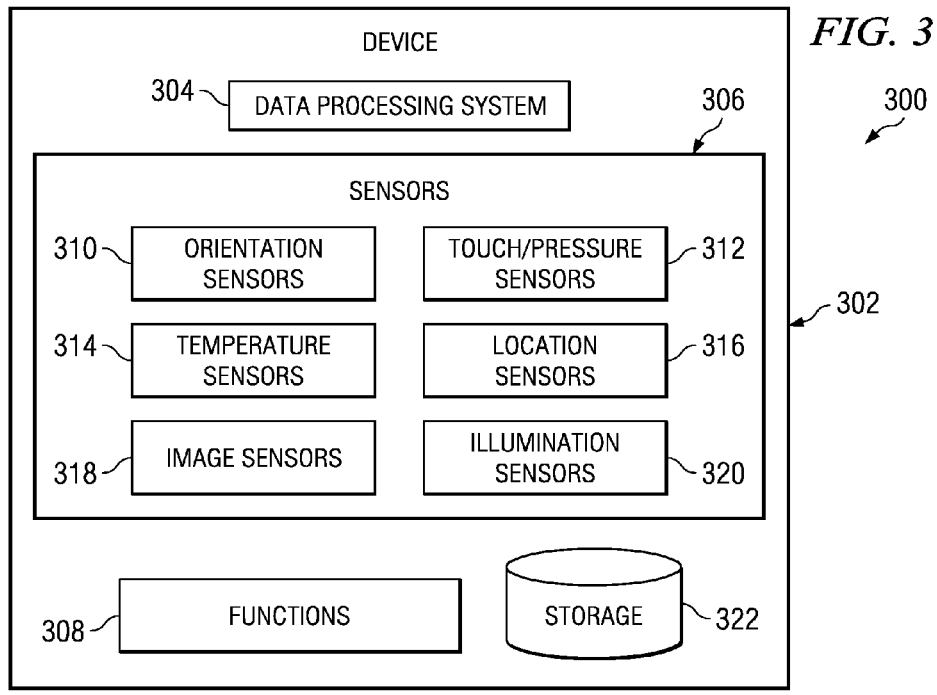
FIG. 3 depicts a functional block diagram of an electronic device environmental detection system in accordance with an illustrative embodiment.

FIG. 3 depicts a functional block diagram of an electronic device environmental detection system in accordance with an illustrative embodiment. Electronic device environmental detection system 300 may be comprised of device 302, data processing system 304, sensors 306, and functions 308. Device 302 is an electronic device, such as device 114 of FIG. 1, and may be a multifunctional electronic device including one or more functions 308, such as video gaming functionality, cell phone functionality, telephone functionality, or remote control functionality. While the illustrative embodiments are directed to a portable device, the described embodiments may also be implemented in other devices where the orientation of the devices may be changed. Data processing system 304 may be a data processing system, such as data processing system 200 within FIG. 2. Data processing system 304 and sensors 306 are located within device 302. Sensors 306 may include numerous sensors, such as orientation sensors 310, touch/pressure sensors 312, temperature sensors 314, location sensors 316, image sensors 318, and illumination sensors 320, although any type of sensors may be used.

In one illustrative embodiment, one or more of sensors 306 may detect a change in an environmental condition, such as the orientation of device 302. Orientation sensors 310 may detect the orientation of device 302 through the use of a gyroscope or other type of orientation detection system. Using a predefined device orientation, orientation sensors 310 may detect that device 302 is being held horizontally. The predefined device orientation settings may be stored on storage 322 that is a storage unit, such as storage unit 108 of FIG. 1. Orientation sensors 310 send the orientation information to data processing system 304. Data processing system 304 compares the received orientation information to the predefined device orientation settings. If the detected orientation information, respective to the orientation of device 302 shown in FIG. 3, matches the predefined horizontal orientation settings, data processing system 304 initiates a video gaming function on device 302. If data processing system 304 matches the orientation information to the predefined vertical orientation settings, then data processing system 304 initiates a cell phone function on device 302.

In another illustrative embodiment, one or more of sensors 306 may detect a change in an environmental condition, such as how device 302 is being held. Touch/pressure sensors 312 may detect a manner in which device 302 is being held. Numerous touch/pressure sensors 312 may be located around the edges of device 302. As an example, if a user holds device 302 in a position where two hands are on device 302, one on each end of device 302 with respect to the orientation of device 302 shown in FIG. 3, and with the user's fingers on video gaming controls located on the device, then specific ones of touch/pressure sensors 312 will be activated. The specific ones of touch/pressure sensors 312 send their signals to data processing system 304. Data processing system 304 references touch/pressure sensor patterns stored in storage 322 for the initiated touch/pressure sensors 312 to determine which function should be initiated. With reference to the above example, detecting that the user is holding device 302 in a position where two hands are on device 302, one on each end of device 302 and with the user's fingers on video gaming controls located on the device, data processing system 304 would initiate a video gaming function on device 302.

As another example, if a user has one hand on the device, squeezing the sides of device 302 with respect to the orientation of device 302 shown in FIG. 3, then specific ones of touch/pressure sensors 312 will be activated. The specific ones of touch/pressure sensors 312 send their signals to data processing system 304. Data processing system 304 references touch/pressure sensor patterns stored on storage 322 for the initiated touch/pressure sensors 312 to determine which function should be initiated. With reference to the second example, detecting that the user is holding device 302 in a position where one hand is squeezing the sides of device 302, data processing system 304 would initiate a cell phone function on device 302.

In addition to the above examples, if device 302 is being used in either the video gaming function or the cell phone function, touch/pressure sensors 312 continue to send detected signals to data processing system 304 while device 302 is being used in the particular function. If during the use of device 302 in the video gaming function, the user were to let go of device 302, touch/pressure sensors 312 would detect the change and send respective signals to data processing system 304. Data processing system 304 may then pause the game that was being played. If the user picks up device 302 and holds the device in the video gaming function position, then touch/pressure sensors 312 would detect the change, send respective signals to data processing system 304, and data processing system 304 would resume the video game. If device 302 were being used in a cell phone function and the user were to let go of device 302, touch/pressure sensors 312 would detect the change and send respective signals to data processing system 304. Data processing system 304 may then place the phone call on hold. If the user picks up device 302 and holds the device in the cell phone function position, then touch/pressure sensors 312 would detect the change, send respective signals to data processing system 304, and data processing system 304 would resume the phone call.

In another illustrative embodiment, one or more of sensors 306 may detect a change in an environmental condition, such as a location of device 302. Location sensors 316, which may be a global positioning system sensor or other location determining system, may be able to detect the location of device 302 and a speed at which device 302 is moving. Using predefined location setting stored on storage 322, data processing system 304 may determine that the location of device 302, detected by location sensors 316, is a location that requires device 302 act in a predefined mode, such as a cafeteria, a factory floor, a theater, or a library. The location detected by location sensors 316 is sent to data processing system 304 which may determine that device 302 is located in a cafeteria or a factory floor. Then, data processing system 304 may place the cell phone ringer of device 302 on extra loud. If the location detected by location sensors 316 is a theater or a library, then data processing system 304 may place device 302 in a vibrate mode. Using predefined movement settings, if locations detected by location sensors 316 are used by data processing system 304 to determine that device 302 is traveling at 70 miles per hour, then data processing system 304 may automatically disable some of the functions performed by device 302, such as the cell phone function or the video gaming function.

In another illustrative embodiment, one or more of sensors 306 may detect a change in an environmental condition, such as the temperature of the area where device 302 is being used. Temperature sensors 314 may detect an ambient temperature of the area where the device is being used. Using predefined temperature setting, which may be defaulted settings or user defined settings stored on storage 322, temperature sensors 314 may detect device 302 is in an area where the ambient temperature is 95 degrees Fahrenheit or 32 degrees Fahrenheit. Temperature sensors 314 send the detected temperature to data processing system 304. Data processing system 304 refers to the predefined temperature settings, which may indicate that device 302 is outside of a normal temperature environment and that data processing system 304 should place the cell phone ringer of device 302 on extra loud. Likewise, if temperature sensors 314 detect that device 302 is in an area where the ambient temperature is 70 degrees Fahrenheit, then data processing system 304 refers to the predefined temperature settings, which may indicate that device 302 is inside of a normal temperature environment and that data processing system 304 should place the cell phone ringer of device 302 on normal.

In another illustrative embodiment, one or more of sensors 306 may detect a change in an environmental condition, such as the illumination of the area where device 302 is being used. Illumination sensors 320 may detect the illumination of the area where the device is being used. Using predefined illumination settings, which may be defaulted settings or user defined settings stored on storage 322, illumination sensors 320 may detect device 302 is in an area that is darkly lit. Illumination sensors 320 send the detected illumination level to data processing system 304. Data processing system 304 refers to the predefined illumination settings, which may indicate that device 302 is outside of a normal illumination environment and that data processing system 304 should illuminate a display on device 302. Likewise, if illumination sensors 320 detects device 302 is in an area that is brightly lit, illumination sensors 320 send the detected illumination level to data processing system 304. Data processing system 304 refers to the predefined illumination settings, which may indicate that device 302 is outside of a normal illumination environment and that data processing system 304 should cancel any existing illumination of the display on device 302. As another example, if illumination sensors 320 detect an illumination level which is 80 percent of the ideal illumination level, then data processing system 304 may illuminate the display on device 302 by 20 percent to create the ideal illumination.

In another illustrative embodiment, one or more of sensors 306 may detect a change in an environmental condition, such as an image that can be identified by device 302. Device 302 may include one or more image sensors 318, which may be an image capturing devices, such as a camera or optical sensor, and may capture an image that is similar to a predefined image. The captured image may be of an ear or a television. Using predefined images, which may be stored on storage 322, data processing system 304 may use pattern matching to determine that the captured image is similar to the image of an ear stored in storage 322. Data processing system 304 refers to the predefined image settings, which may indicate that device 302 is next to a user's ear and set the device into a calling function. If the image detected by image sensors 318 is an image of a television, then data processing system 304 may use pattern matching to determine that the captured image is similar to the image of a television stored in storage 322. Data processing system 304 refers to the predefined image settings, which may indicate that the image detected by image sensors 318 is the user's television and set device 302 into a television remote control function.

In addition to the above illustrative embodiments, one or more of sensors 306 may be used in conjunction with other sensors in sensors 306. For example, if image sensors 318 detect the image of a television, normally data processing system 304 would place device 302 in a television remote control function. However, if the user does not want this function to occur every time the user walks within the viewing area of the television, then the user may initiate a combination of sensors such that image sensors 318 must detect the image of a television and touch/pressure sensors the squeezing the sides of device 302 with respect to the orientation of device 302 shown in FIG. 3. Data processing system 304 would then initiate a television remote control function on device 302.

FIG. 4 shows an exemplary table of settings for changing electronic device functionality based on environmental conditions in accordance with an illustrative embodiment. Settings table 400 may include fields that identify sensor 402, detected signals 404, and function to be applied 406. Settings table 400 may be used by a data processing system, such as data processing system 304 of FIG. 3. The data processing system receives signals from numerous sensors, such as sensors 306 of FIG. 3. Each signal received from the numerous sensors identifies the type of sensor it is sent from. The data processing system uses the sensor identity to look up the possible action that may be applied using sensor field 402. Then, the data processing system uses the information received from the sensor to further limit the exact detected signal using detected signals field 404. Using these two limitations, the data processing system is able to identify the action to be applied to the multifunctional electronic device specified in function to be applied field 406.

Entries in section 408 of settings table 400 are entries for use with signals from orientation sensors, such as orientation sensors 310 in FIG. 3. Functions that might be applied in section 408 are cell phone or video gaming functions. Entries in section 410 of settings table 400 are entries for use with signals from touch/pressure sensors, such as touch/pressure sensors 312 in FIG. 3. Functions that might be applied in section 410 are cell phone or video gaming functions. Entries in section 412 of settings table 400 are entries for use with signals from temperature sensors, such as temperature sensors 314 in FIG. 3. Functions that might be applied in section 412 are a loud ringer or normal ringer function for the cell phone function.

Entries in section 414 of settings table 400 are entries for use with signals from location sensors, such as location sensors 316 in FIG. 3. Functions that might be applied in section 414 are loud ringer, normal ringer, or vibrate mode for the cell phone or disabling cell phone functionality. Entries in section 416 of settings table 400 are entries for use with signals from image sensors, such as image sensors 318 in FIG. 3. Functions that might be applied in section 416 are cell phone, remote control, or normal operation functions. Entries in section 418 of settings table 400 are entries for use with signals from illumination sensors, such as illumination sensors 320 in FIG. 3. Functions that might be applied in section 418 are illuminate the cell phone display or normal operation. Entries in section 420 of settings table 400 are entries for use with multiple signals from multiple sensors, such as image sensors 318 and touch/pressure sensors 312 in FIG. 3.

Figure 5:
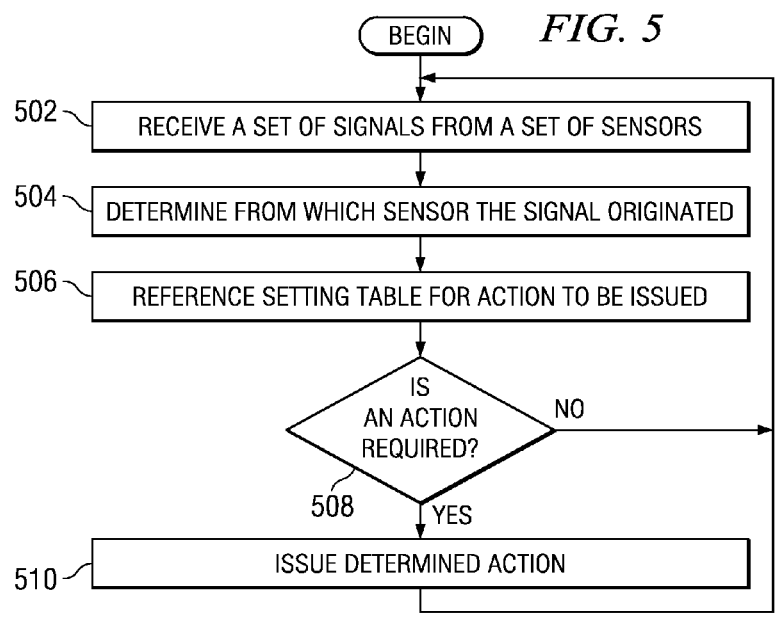
FIG. 5 illustrates a flowchart of the operation performed by an electronic device environmental detection system in accordance with an illustrative embodiment.

FIG. 5 illustrates a flowchart of the operation performed by an electronic device environmental detection system in accordance with an illustrative embodiment. The signals used by the data processing system may be from sensors, such as sensors 306 of FIG. 3.

As the operation beings, a data processing system, such as data processing system 304 of FIG. 3, receives signals from a set of sensors (step 502). The set of sensors is one or more sensors that may be heterogeneous. The data processing system determines, based on the information contained in the received signals, what type of sensor sent the signal (step 504). The data processing system uses the sensor type information along with the specific signal information to look up an action that is to be issued in the multifunctional electronic device in a setting table, such as settings table 400 of FIG. 4 (step 506). The data processing system determines using the information found in the lookup table if an action is to be issued for the multifunctional electronic device (step 508). If at step 508 no action is indicated in the settings table, the operation returns to step 502, and the data processing system waits for the next received signal. If at step 508 the data processing system determines an action is to be taken, the data processing system issues the action indicated by the settings table (step 510), with the operation returning to step 502 thereafter.

Thus, the illustrative embodiments provide for changing device functionality based on environmental conditions detected by sensors location on the multifunctional electronic device. Functionality may be changed based on one or more of orientation of the device, how the device is being held, location of the device, movement of the device, temperature of the environment where the device is being used, illumination of the area where the device is being used, and images captured by the device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for changing functionality for an electronic device, the computer implemented method comprising:
   receiving a set of signals from a set of sensors in the electronic device, wherein each signal in the set of signals includes a sensor identity identifying a type of sensor from which the signal originated in the set of sensors and sensor information detected by the set of sensors;
   identifying a section of possible actions, wherein each section of possible actions comprises one or more actions associated with a respective sensor in the set of sensors to be issued for the electronic device, wherein the section of possible actions is identified using the sensor identity for the type of sensor from a storage location comprising sections of entries by sensor for the set of sensors;
   identifying a specific action in the section of possible actions using the sensor information; and
   automatically initiating the specific action in the electronic device, wherein the specific action changes the functionality for the electronic device.

2. The computer implemented method of claim 1, wherein the specific action is at least one of switching the electronic device to a cell phone function, switching the electronic device to a video gaming function, a remote control function, or a telephone function.

3. The computer implemented method of claim 1, wherein the type of sensor is at least one of an orientation sensor, a touch/pressure sensor, a temperature sensor, a location sensor, a movement sensor, an image sensor, or an illumination sensor.

4. The computer implemented method of claim 3, wherein the set of sensors includes a set of orientation sensors and wherein the set of orientation sensors detect at least one of a horizontal position or a vertical position of the electronic device.

5. The computer implemented method of claim 3, wherein the set of sensors include a set of touch/pressure sensors and wherein the set of touch/pressure sensors detect how the electronic device is being held.

6. The computer implemented method of claim 3, wherein the set of sensors include a set of temperature sensors and wherein the set of temperature sensors detect a temperature of an area where the electronic device is being used.

7. The computer implemented method of claim 3, wherein the set of sensors include a set of location sensors and wherein the set of location sensors detect a location where the electronic device is being used.

8. The computer implemented method of claim 7, wherein the set of location sensors detect a movement of the electronic device and the movement of the electronic device is used to determine a speed at which the electronic device is moving.

9. The computer implemented method of claim 3, wherein the set of sensors include a set of image sensors and wherein the set of image sensors captures images of objects near where the electronic device is being used.

10. The computer implemented method of claim 3, wherein the set of sensors include a set of illumination sensors and wherein the set of illumination sensors detect an illumination of an area where the electronic device is being used.

11. An apparatus for changing functionality for an electronic device, the apparatus comprising:
    a bus;
    a main memory connected to the bus, wherein the main memory contains computer executable program code;
    a processing unit, in communication with the bus, wherein the processing unit executes the computer executable program code to direct the apparatus to:
    receive a set of signals from a set of sensors in the electronic device, wherein each signal in the set of signals includes a sensor identity identifying a type of sensor from which the signal originated in the set of sensors and sensor information detected by the set of sensors;
    identify a section of possible actions, wherein each section of possible actions comprises one or more actions associated with a respective sensor in the set of sensors to be issued for the electronic device, wherein the section of possible actions is identified, using the sensor identity for the type of sensor, from a storage location comprising sections of entries by sensor for the set of sensors;
    identify a specific action in the section of possible actions using the sensor information; and
    initiates the specific action in the electronic device automatically, wherein the specific action changes the functionality for the electronic device.

12. The apparatus of claim 11, wherein the apparatus is a microprocessor based computing device and wherein the specific action is at least one of switching the electronic device to a cell phone function, switching the electronic device to a video gaming function, a remote control function, or a telephone function.

13. The apparatus of claim 11, wherein the type of sensor is at least one of an orientation sensor, a touch/pressure sensor, a temperature sensor, a location sensor, a movement sensor, an image sensor, or an illumination sensor.

14. The apparatus of claim 13, wherein the set of sensors includes a set of orientation sensors and wherein the set of orientation sensors detect at least one of a horizontal position or a vertical position of the electronic device, wherein the set of sensors include a set of touch/pressure sensors and wherein the set of touch/pressure sensors detect how the electronic device is being held, and wherein the set of sensors include a set of temperature sensors and wherein the set of temperature sensors detect a temperature of an area where the electronic device is being used.

15. The apparatus of claim 13, wherein the set of sensors include a set of location sensors and wherein the set of location sensors detect a location where the electronic device is being used, wherein the set of location sensors detect a movement of the electronic device and the movement of the electronic device is used to determine a speed at which the electronic device is moving, wherein the set of sensors include a set of image sensors and wherein the set of image sensors captures images of objects near where the electronic device is being used, and wherein the set of sensors include a set of illumination sensors and wherein the set of illumination sensors detect an illumination of an area where the electronic device is being used.

16. A computer program product comprising:
a memory element including computer executable program code for changing functionality for an electronic device, the computer program product including:
computer executable program code for receiving a set of signals from a set of sensors in the electronic device, wherein each signal in the set of signals includes a sensor identity for identifying a type of sensor from which the signal originated in the set of sensors and sensor information detected by the set of sensors;
computer executable program code for identifying a section of possible actions, wherein each section of possible actions comprises one or more actions associated with a sensor in the set of sensors, to be issued for the electronic device, wherein the section of possible actions is identified using the sensor identity for the type of sensor, from a storage location comprising sections of entries, by sensor, for the set of sensors;
computer executable program code for identifying a specific action in the section of possible actions using the sensor information; and
computer executable program code for automatically initiating the specific action in the electronic device, wherein the specific action changes the functionality for the electronic device.

17. The computer program product of claim 16, wherein the specific action is at least one of switching the electronic device to a cell phone function, switching the electronic device to a video gaming function, a remote control function, or a telephone function.

18. The computer program product of claim 16, wherein the type of sensor is at least one of an orientation sensor, a touch/pressure sensor, a temperature sensor, a location sensor, a movement sensor, an image sensor, or an illumination sensor.

19. The computer program product of claim 18, wherein the set of sensors includes a set of orientation sensors and wherein the set of orientation sensors detect at least one of a horizontal position or a vertical position of the electronic device, wherein the set of sensors include a set of touch/pressure sensors and wherein the set of touch/pressure sensors detect how the electronic device is being held, and wherein the set of sensors include a set of temperature sensors and wherein the set of temperature sensors detect a temperature of an area where the electronic device is being used.

20. The computer program product of claim 18, wherein the set of sensors include a set of location sensors and wherein the set of location sensors detect a location where the electronic device is being used, wherein the set of location sensors detect a movement of the electronic device and the movement of the electronic device is used to determine a speed at which the electronic device is moving, wherein the set of sensors include a set of image sensors and wherein the set of image sensors captures images of objects near where the electronic device is being used; and wherein the set of sensors include a set of illumination sensors and wherein the set of illumination sensors detect an illumination of an area where the electronic device is being used.

* * * * *